March 25, 1947.  W. J. DEGNEN  2,417,973
PROCESS FOR THE CATALYTIC CONVERSION OF HYDROCARBON OILS
Filed Jan. 28, 1941  3 Sheets-Sheet 3

WILLIAM J. DEGNEN.
INVENTOR
ATTORNEY

Patented Mar. 25, 1947

2,417,973

UNITED STATES PATENT OFFICE 2,417,973

PROCESS FOR THE CATALYTIC CONVERSION OF HYDROCARBON OILS

William J. Degnen, Westfield, N. J., assignor to The M. W. Kellogg Company, Jersey City, N. J., a corporation of Delaware Application January 28, 1941, Serial No. 376,316

12 Claims. (Cl. 196—52)

My invention relates to process and apparatus for converting hydrocarbons in the presence of a catalytic material. The art of cracking in the presence of a catalyst is well known where the catalyst is maintained in a bed and the liquid or vapor to be treated is passed through the bed during the conversion period. To regenerate or revivify a bed of catalyst in situ, it is necessary to subject the catalytic material to heating in such manner as to burn off carbonaceous or contaminating materials and difficulties have continually arisen in the regeneration of the catalyst.

More particularly, it has been proposed heretofore to catalytically convert high boiling hydrocarbons such as gas oil to low boiling hydrocarbons such as gasoline by passing vapors of the high boiling hydrocarbons under suitable reaction conditions in contact with a bed of cracking catalyst disposed in a catalyst chamber. After the activity of the catalyst is decreased by reason of the formation of a carbonaceous deposit thereon to a degree where regeneration is necessary or desirable, the activity of the catalyst is restored by shutting off the flow of oil vapor to the chamber and passing an oxygen-containing gas into the chamber in contact with the catalyst thereby regenerating the catalyst in situ by combustion of the carbonaceous deposit. This procedure while constituting a practical commercial operation has a number of disadvantages which are eliminated by the process provided by my invention. Among these disadvantages are the intermittent operation, variations in product quality and quantity during the reaction period, and difficulties in temperature control, particularly in the regeneration operation.

It has been further proposed in copending application, S. N. 199,702, filed April 2, 1938, in which applicant is a co-inventor to secure continuous operation by maintaining a bed of granular catalytic cracking material in the reaction chamber and to maintain the average catalytic activity of the bed substantially constant throughout the operation by adding active catalyst thereto and removing spent catalyst therefrom by mechanical feeding means without interruption of the flow of oil vapors through the chambers. The present process has certain features in common with and also advantages over the process described in said application and accordingly it may be classified as an improvement thereover.

An object and an advantage of the present invention is to provide a method of converting hydrocarbons in the presence of a catalyst so that during the reaction time, or during the period in which the hydrocarbons are in contact with the catalytic material, temperatures of reaction can be more accurately controlled. Another object of the invention is to provide an intimate mixture or association of the catalytic material and hydrocarbon vapors in such manner that the vapors are afforded an opportunity for more intimate mixture with the catalyst due to the fact that the catalyst is carried along in intimate mixture in the vapor during the reaction period.

The method also provides a more complete and effective utilization of the catalyst and provides a simplified method for regenerating or revivifying the catalyst.

In the accompanying drawings, which form part of the specification and are to be read in conjunction therewith, Fig. 1 is a diagrammatic showing of an apparatus in which the process may be operated;

Figure 1:
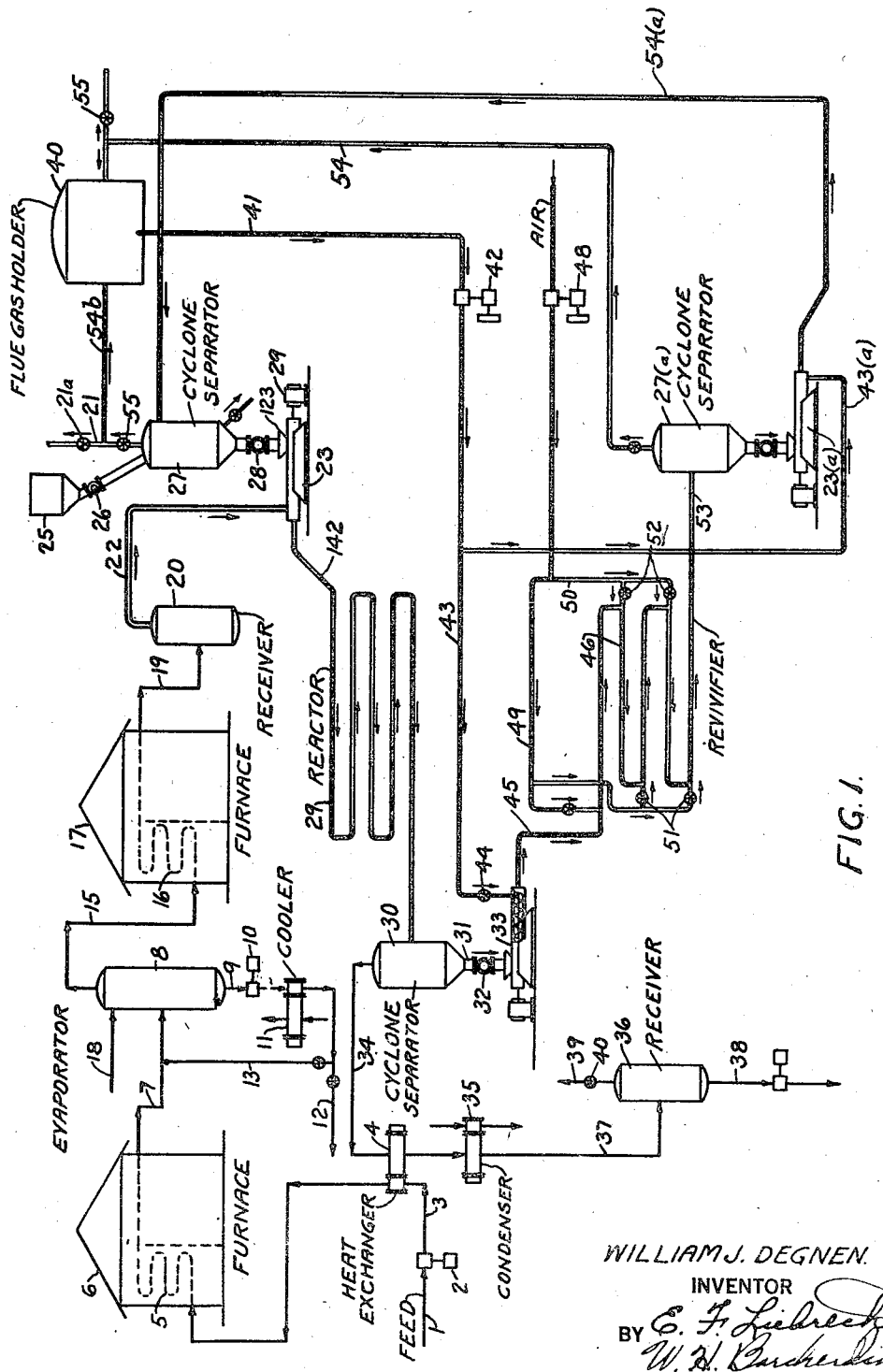

Referring to the drawings, and describing the method as applied to the cracking of topped crude in the apparatus, the charge is supplied from any suitable source through line 1 and is pumped by means of a pump 2 through a line 3 and heat exchanger 4 to the heating coil 5 in a furnace 6. In the furnace the charge is heated to a vaporizing temperature from 800 to 875° F. and is discharged through a transfer line 7 to an evaporator 8, where the unvaporized oil is separated from the vapor. The tar, or unvaporized liquid is withdrawn from the evaporator through a pipe 9 and is pumped by pump 10 through a cooler 11 to storage through the pipe 12, or may be recirculated through line 13 to the transfer line 7 and back into the evaporator. Valves in the lines 12 and 13 furnish means for controlling this flow as described. The vapors rise in the evaporator and are directed through the vapor line 15 to heating coil 16 positioned in furnace 17, where the vapor temperature is raised to a suitable conversion temperature, preferably 925° F. as a maximum. Into the top of the evaporator may be introduced a cooling liquid through the pipe 18 in order to regulate the top temperature maintained in the evaporating stage. From the vapor heater 16 the vapors pass through transfer line 19 through a receiver 20, serving as a surge tank. Vapors pass from the top of the receiver through pipe 22 and are introduced into a "solids-pump" or mixing device 23, where they are combined with the solid catalytic material.

The catalyst is in a finely divided state, or in pulverulent form, such that it may be readily carried along with the vapor through the reaction zone. The catalytic material is supplied from any convenient source, through a hopper 25 controlled by a valve 26 into a cyclone separator 27, whose discharge is connected to the solids-pump 23, and is regulated by a rotary valve or metering arrangement 28. The solids-pump or mixer 23 is driven from any suitable source of power, such as a motor 29.

This device 23, which supplies the catalyst to the vapors is preferably an arrangement such as the device furnished by the Fuller Kinyon Company, and is described in detail in U. S. Pat. 1,553,539, and a modification thereof in U. S. Pat. 2,102,330. A similar commercial device is known as the "Airveyor," the difference between the Airveyor and the devices shown in the patents referred to being in the relative amount of carrier or gas used to support or carry the solid particles through the reaction zone. In the Airveyor device, considerably more air or other carrier is used to suspend the solid particles than is employed in the devices of Kinyon and Newcomer, described in the patents.

Figure 3:
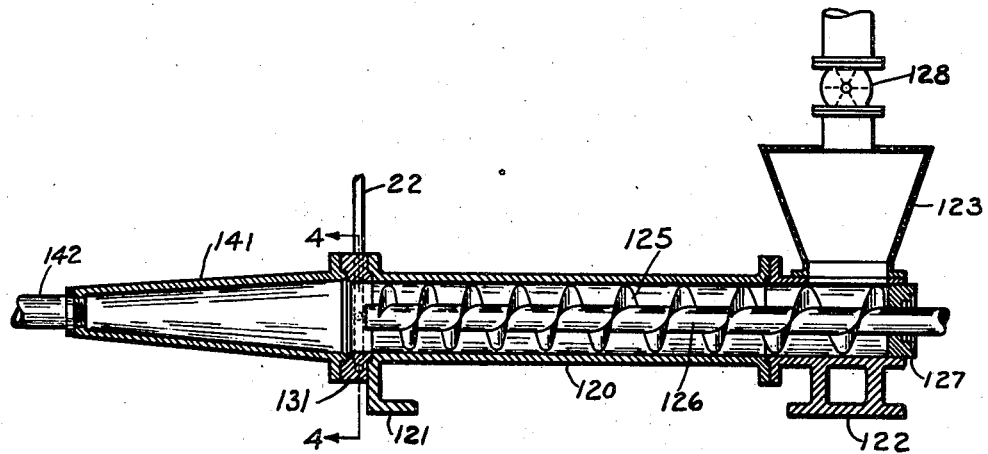
Fig. 3 is a longitudinal sectional view of suitable means for introducing a mixture of oil vapor and catalyst in the system.
Figure 4:
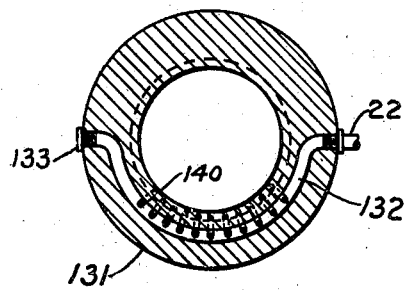
Fig. 4 is a sectional view along the line 4—4 of Fig. 3.

A typical type of Kinyon solids-pump is illustrated in Figs. 3 and 4. Numeral 120 indicates a cylindrical casing provided at one end with a supporting foot 121 and connected at the other end to a standard 122, having a cylindrical bore of the same diameter as the interior of the casing. Above the bore is a hopper 123 of a suitable shape and capacity into which the catalytic material is discharged by rotary valve 128. Extending through the bore of the casing 120 is a screw element 125, the shaft 126 of which projects through a suitable bushing 127 which also serves as a closure for the outer end of the bore. The shaft is rotated by any suitable means (not shown) such as an electric motor.

As shown, the pitch of the screw element 125 decreases from the end at which catalytic material is supplied to the end from which it is discharged. The purpose of this arrangement is to compress the material as it approaches the discharge end of the screw, so that the material will act as a seal to prevent the gas which is introduced into the material as it leaves the screw from flowing through the casing toward the hopper and aerating the material before it has been discharged from the screw.

For the purpose of introducing fluid into the material there is attached to the forward end of casing 120 an annular casting 131, the lower portion of which is provided with a semicircular passage 132 as shown most clearly in Fig. 4. This passage is substantially concentric with the bore of the casting and its ends are brought out to the exterior of the casting, preferably at diametrically opposite points. One end of the passage may be closed by a screw plug 133, while into the other end is connected to line 22.

For the purpose of introducing the vapor from the passage 132 into the pulverized material, there is provided a series of forwardly directed ports 140 between the passage 132 and the interior of the casting. The ports 140 are not limited to the particular number or arrangement shown, and may extend over a greater or lesser arc, and in fact may be arranged around the entire circle, in which case the passage 132 will surround the bore of the casting. The ports 140 may be located at a distance from the end of the screw element determined with reference to certain other features of the installation. As the pressure in the system against which the material is to be discharged increases there should be a greater packing or sealing effect behind the jets in order that the higher pressure fluid which is necessary for such increased distances should be forced into the material and prevented from flowing through the screw conveyor toward the hopper. This result may be obtained by locating the ports at a greater distance from the end of the screw conveyor.

Attached to the front face of annular casting 121 is a tapering casing or chamber 141, the outer end of which is connected to reactor transfer line 142.

One of the advantages of a solids-pump of the type illustrated is that finely divided solid material after being brought into sufficiently fluent condition may be forced or pumped through pipes by mechanical means in much the same way as water, oils, or other liquids are conveyed. This may be accomplished by injecting the fluid into the solid material within the conveying device in an amount which will suffice to prevent packing of the material and render it sufficiently fluent so that it may be propelled throughout a system of considerable length by pressure applied to the material at one end of the system. The injection of the gas into the material gives it a sluggishly fluent condition which makes it possible to effect the movement of the material as described. This condition of the mixture is quite distinct from those systems in which the particles of material are held in suspension in a relatively large volume of moving fluid. Accordingly, solids-pumps of this type have the advantage of extreme flexibility with respect to the proportions of catalyst and oil fed to the system.

To the solids-pump 23 are supplied catalyst from the hopper 27 and vapors through the line 22. The vapors are at a suitable reaction temperature and are mixed with the catalyst to form a suspension or mixture which has the flow characteristics of a fluid. This mixture is directed through a reaction chamber or zone 29, which is shown in the form of a continuous pipe or coil. In order to maintain the temperatures of the suspension of vapors and catalyst, the reactor is either heavily insulated or is positioned in a furnace setting to which the desired heat is supplied to maintain proper reaction temperatures. The discharge end of the reactor is connected to a separator 30 wherein the solid particles are separated from the suspension and are drawn off through a bottom discharge line 31 controlled by valve 32. This discharge pipe feeds into a conveyor arrangement 33, which directs the solid catalyst to the regenerating or revivifying stage.

The vapors separated from the catalyst in the separating vessel 30 pass out through the vapor line 34 and are passed in heat exchange with the charge in exchanger 4, and are thereafter condensed at 35 and directed to a receiver 36 through pipe 37. The receiver is equipped with a liquid draw-off line 38 and a gas line 39 controlled by a valve 40.

The conveyor 33, into which is charged catalyst from the separator 30, may be a device of similar design and function as that shown at 23. Instead, however, of using hydrocarbon vapor, flue gas is used to carry the catalyst particles through the regeneration zone. This gas is obtained from any source, such as the gas holder 40 from which it is withdrawn through line 41, and pumped by compressor 42 through line 43 controlled by valve 44 to conveyor 33, where it is intimately combined with the catalyst discharged from the separator. The gas catalyst mixture passes through the pipe 45 into the revivifier 46, wherein the temperature is controlled within a range of from 800 to 1200° F. as a maximum by introducing additional flue gas as required. To the revivifier, at a plurality of points along the travel of the gas catalyst mixture therethrough, air is supplied by means of compressor 48 through connecting lines 49 and 50, which are equipped with secondary connections 51 and 52 regulated by suitable valves. The amount of air or other oxidizing medium supplied to the gas catalyst mixture is determined by the temperatures at which the catalyst is revivified and the extent of contamination. From the revivifier the mixture passes through pipe 53 and is discharged into the cyclone separator 27a, where the catalyst is permitted to separate from the gas, the gas rising into the top of the cyclone and is withdrawn through pipe 54 by means of which it is returned to the flue gas holder 40. Excess or make flue gas may be withdrawn from the system through pipe 21 controlled by valve 21a or may be withdrawn through valve 55.

Catalyst is withdrawn from the bottom of cyclone separator 27a and discharged into a conveying device 23a which may be similar in construction to device 23. Flue gas supplied through bypass line 43a may be introduced into 23a and utilized to recycle the regenerated catalyst through line 54a to the cyclone separator 27. In place of discharging into separator 27a, line 53 may be connected directly to and discharged into cyclone separator 27, thereby dispensing with cyclone separator 27a and connecting lines thereto.

Figure 2:
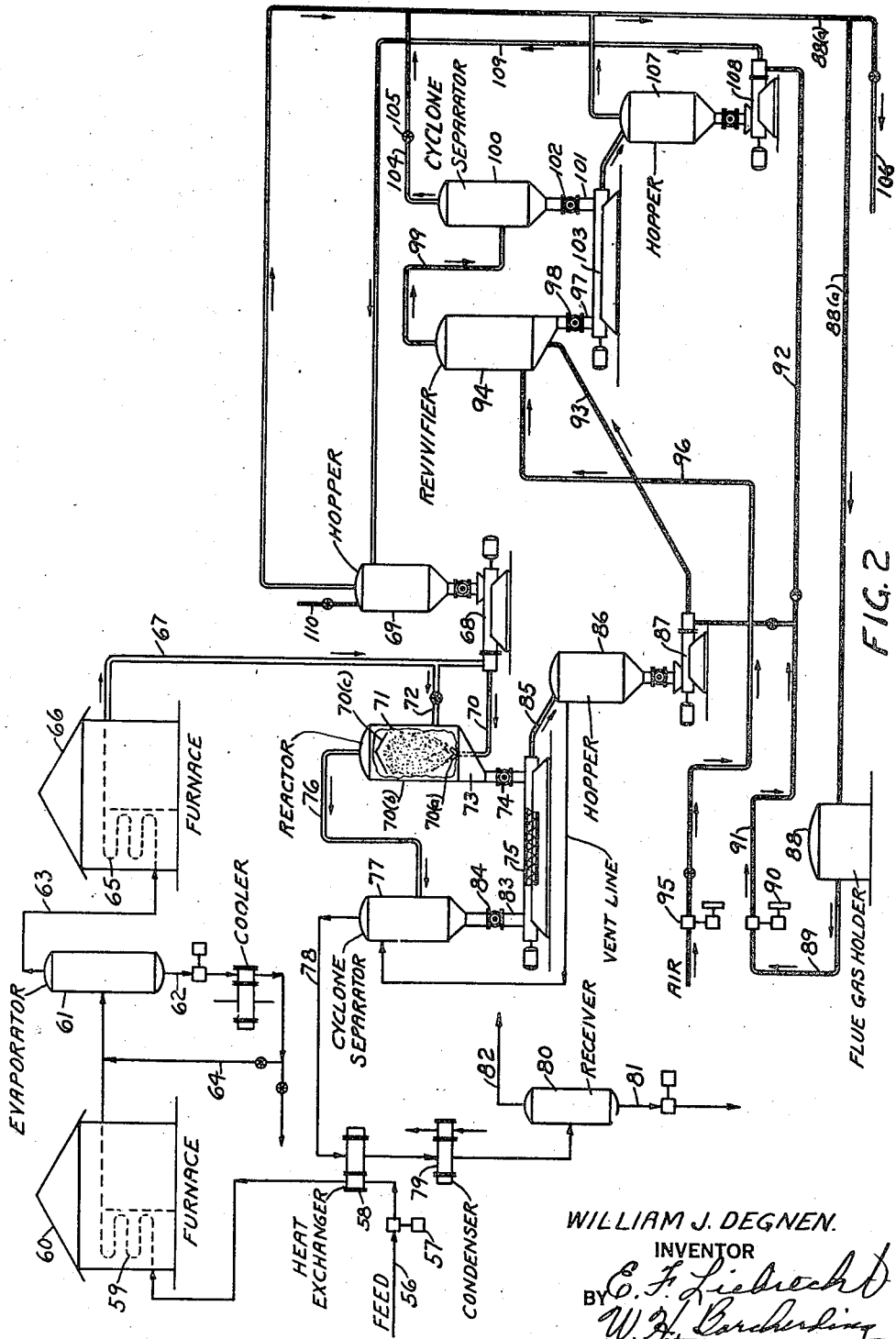
Fig. 2 is a modified type of apparatus using a different type of reactor, and revivifier.

In the modified type of construction shown in Fig. 2, the charge is fed from any suitable source through line 56 by means of pump 57 through exchanger 58 to the heating coil 59 positioned in furnace 60. After being raised to a vaporizing temperature, the oil vapor mixture is separated in an evaporator 61 equipped with a liquid draw-off line 62 and vapor draw-off line 63. A recirculation line 64 is furnished to charge back portions of bottoms into the transfer line between heater 59 and evaporator 61. The vapors are superheated in a heater 65 positioned in furnace 66, and are thence passed through line 67 into a vapor catalyst mixing pump 68, similar in character to that shown at 23 in Fig. 1. Catalyst is supplied to the pump 68 from a cyclone separator 69. The catalyst vapor mixture is discharged from the pump 68 through line 70 into reactor 71, the discharge end of the transfer pipe 70 terminating in a nozzle or aspirating arrangement 70a whereby the catalyst vapor mixture is maintained in the reactor in the form of a cloud, mist or fog 70b during the reaction period. A separate connection 72 between the line 67 and the reaction chamber 71 furnishes a means for by-passing vapors around the mixing pump and directly to the reaction chamber. A valve in line 72 may be regulated to control the amount of vapors by-passed. The nozzle arrangement 70a at the discharge end of the pipe 70 may be of any suitable type, either a device which mechanically whirls the suspension of vapor and catalyst, or nozzles so arranged as to direct the suspension of cloud or vapor catalyst mixture so that it is uniformly distributed throughout the catalyst chamber. A baffle 70c may be provided in the upper part of the reactor 71 to assist in the maintenance of the desired cloud or mist of catalyst in the reaction zone. The bottom of the reactor 71 is inclined to direct catalyst separated from the suspension into a discharge pipe 73 controlled by valve 74 into conveyor 75. From the reactor 71 the vapor catalyst suspension containing the catalyst not separated through valve 74 passes through pipe 76 to separator 77 where the solid particles of catalyst are separated from the vapors. The vapors from the separator are directed through the vapor line 78 through exchanger 58 and condenser 79 to the gas separator or receiver 80, which is equipped with a liquid draw-off line 81 and a gas line 82. Catalyst removed from the vapors in the separator 77 passes out through pipe 83 controlled by valve 84 to the conveyor 75 where it joins the catalyst withdrawn from the bottom of reactor 71, the combined catalyst passing through line 85 to hopper 86 which feeds mixing device 87, similar in character to that shown at 68. The mixing and conveying device 87 is supplied with flue gas from the holder 88 through pipe 89 and flue gas compressor 90. This flue gas compressor discharges the flue gas through pipe 91 connected to mixer 87, and also through pipe 92 to a separate mixing device hereinafter described. The flue gas catalyst mixture or suspension formed in mixing device 87 is passed through pipe 93 into a revivifier 94, of similar construction to the reactor 71, the mixture of flue gas and catalyst being discharged in the form of a cloud or mist in the revivifying chamber, there being supplied an oxidizing gas such as air by means of compressors 95 through pipe 96. Valves in the flue gas and air supply lines furnish means for controlling the supply of the respective mediums. Catalyst which separates from the flue gas in the revivifying chamber is withdrawn through line 97 controlled by valve 98. The revivification product gases pass from the revivifier 94 through line 99 to a separator 100, where any remaining catalyst particles are removed from the gaseous combustion products or flue gas. This catalyst is withdrawn through line 101 controlled by valve 102 and is combined with the catalyst removed from the revivifying chamber in a conveyor 103. The flue gas is discharged from the separator 100 through line 104 controlled by valve 105, and is returned to the flue gas holder 88 through line 88a. A line 106 controlled by a suitable valve furnishes a means for withdrawing excess or make flue gas from the system. The revivified catalyst picked up by the conveyor 103 is discharged into a hopper 107 from which it is supplied to a conveying device 108, which may be similar to that shown at 68. Flue gas is introduced into this device through line 92 to serve as a carrier medium to return the revivified catalyst through pipe 109 back to the cyclone separator or hopper 69 attached to the mixing device 68. Hopper 107 and mixing device 108 may be dispensed with by discharging catalyst from conveyor 103 directly into hopper 69. When so directly discharged into cyclone 69, it will be apparent that the regenerated catalyst will remain at the high temperature to which it is raised during regeneration and will be at approximately the temperature required for conversion. Dependent upon the temperature of the catalyst thus supplied, the temperature of the oil vapor may be regulated so that the temperature of the combined vapor-catalyst mixture is that desired for the cracking or other conversion reaction involved. Fresh catalyst may be supplied to the hopper 69 through pipe 110 controlled by suitable valve.

Figure 5:
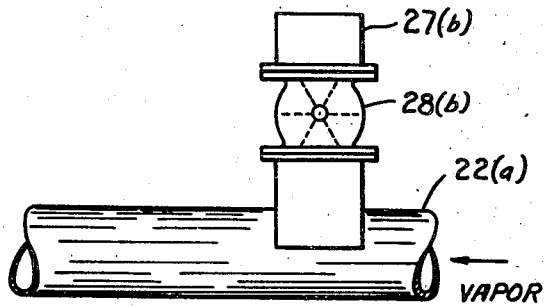
Fig. 5 illustrates a modified type of means for introducing a mixture of oil vapor and catalyst into the system.

Figure 5 illustrates an alternative type of device for dispersing the catalyst particles in the reactant vapors, this type of device being employed in what is known commercially as the "Airveyor" pneumatic conveying system. With this device, the catalyst is fed from a suitable source 27b through a rotary seal 28b and drops into the oil vapor which is passed through line 22a at a high velocity. This type of dispersing device lacks a number of advantages of the device illustrated by Figure 3 as applied to the present process. The latter device is especially advantageous in that it may be used with a relatively high proportion of catalyst to oil in the feed mixture, and also the compacted catalyst in the catalyst supply conduit 120 provides an effective seal between the various parts of the system.

The catalyst employed in the process is preferably introduced in finely divided or powdered condition, that is, about 20 to 200 mesh material or finer. The chemical composition and physical structure of the catalyst selected is dependent upon the type of hydrocarbon conversion involved, and the catalyst employed may be any one of the many available types. For catalytic cracking, known types of cracking catalysts such as activated clays, for example, "Super Filtrol," silica gel activated with alumina, and similar types of silica-alumina type of catalysts are preferred.

Reaction conditions such as temperature, pressure, proportions of catalyst and oil in the feed mixture and dimensions of the reactor are determined with respect to the proper conversion of the particular stock treated and quantity thereof charged. A catalyst to oil feed ratio of 3 to 1 by weight is typical of a suitable feed ratio for catalytic cracking, utilizing a cracking catalyst of the type indicated above. Satisfactory operating conditions for any particular predetermined requirements such as a particular charging stock, particular catalyst, and extent and degree of conversion, are necessarily determined by several experimental runs as will be apparent to those skilled in the art, and one of the advantages of the process is the extreme flexibility it permits in varying the feed rate of catalyst and oil in the feed mixture, and concentrations in the reaction and regeneration zones.

In the method described with reference to Figure 2, an important feature is the relatively high concentration of catalyst provided in the expansion and conversion zone 71. In this method, the hydrocarbon vapors pass successively from a zone of high velocity in the furnace transfer line 67 to a zone of very low velocity in the expansion and conversion zone 71, and then again into a zone of high velocity in the transfer line 76 leading to the separating zone 77. Furnace transfer line velocities in accordance with conventional practice are usually maintained within the range of about 75 to 100 ft./second. In the travel of the dispersion of catalyst and vapors upwardly through the zone 71, the effect of "slip" in building-up of an increased concentration of the catalyst (compared with the concentration in line 70) is greatly accentuated due to the low vapor velocity in zone 71 and produces what may be termed a cloud-like formation of catalyst particles in the reactor. Any catalyst particles separating out from the dispersion at the bottom of the reactor due to the low vapor velocities maintained in zone 71 may be withdrawn through valve 74.

In general, it will be noted that the methods of catalytically converting hydrocarbons described in the foregoing exhibits a number of important distinct features and advantages. One of the features of the process resides in its continuous operation and the circulation of the finely divided catalyst in dispersed condition in both the conversion and regeneration zones. A further feature of the process is the interrelation preferably maintained between the regeneration operation and conversion operation arising from the temperature control of the catalyst between these zones. The process in this respect contemplates as a preferred condition the transfer of the catalyst from the conversion zone to the regeneration zone at a temperature above its ignition temperature, and the transfer from the regeneration zone to the conversion zone at a temperature approximating the required conversion temperature.

A further feature of the process resides in its extreme flexibility. The use of a conveying and mixing device such as illustrated in Figure 3 makes it feasible to introduce a dispersion into the system comprising a very high proportion of catalyst relative to the oil introduced.

A further feature of the operation particularly that shown in Figure 2 is the relatively high concentration of catalyst which may be maintained in the reaction and regeneration zones.

It will be understood that certain features and sub-combinations are of utility and may be employed without reference to other features and sub-combinations. This is contemplated by and is within the scope of the claims.

It is further obvious that various changes may be made in detail within the scope of the claims without departing from the spirit of the invention.

It is, therefore, to be understood that the invention is not to be limited to the specific details shown and described.

This application is a continuation of application Ser. No. 202,252, William J. Degnen, filed April 15, 1938, now U. S. Patent 2,305,569.

I claim:

1. In a continuous process of catalytically converting hydrocarbons which comprises forming a dispersion of finely divided catalyst particles in vapors of the hydrocarbons undergoing conversion, passing the dispersion through a conversion zone under reaction conditions suitable for the desired conversion, separating the vaporous conversion products from the dispersed used catalyst, dispersing the used catalyst in a stream of oxygen-containing gas, passing the dispersion thus produced through a regeneration zone thereby removing by combustion carbonaceous deposit therefrom, and continually utilizing said regenerated catalyst to form said first named dispersion, the improvement which consists in forming the dispersion of the regenerated catalytic particles in the hydrocarbon vapors and introducing the dispersion into the conversion zone by a procedure involving continuously introducing the finely divided regenerated catalyst while still hot to a conduit communicating with the reaction zone, applying pressure to compact the material in said conduit and form a seal to prevent the passage of gases between the regeneration and conversion zones, introducing a reactant gas under pressure at a point beyond the zone of formation of the seal to increase the mobility of the catalyst, and by the pressure so applied and by the gas thus introduced conveying the catalyst material into the conversion zone at a point substantially distant from the point of exit of said hydrocarbons undergoing conversion.

2. A process of catalytically converting hydrocarbons involving contacting vapors of the hydrocarbons at an elevated temperature with a suitable catalyst which comprises continuously supplying particles of the catalyst to a catalyst supply conduit intercommunicating with the conversion zone, admitting the hydrocarbon vapors to the conduit at a point down stream from said supply point to produce a gaseous dispersion of the particles, compacting the catalyst particles in the conduit between the point of their supply and the point of admission of the vapors thereby producing a seal, passing the dispersion thus produced upwardly through a conversion zone of relatively large cross-sectional area wherein the vapor velocity is sufficiently low to cause a cloud-like formation of the catalyst particles in said zone and a portion of the dispersed catalyst to settle out at the bottom of said zone, and withdrawing vaporous conversion products and catalyst particles dispersed therein from the upper portion of said zone and passing them at a relatively high velocity to a separating zone wherein the catalyst is separated from the vapors.

3. A process of catalytically converting hydrocarbons involving contacting vapors of the hydrocarbons at an elevated temperature with a suitable catalyst which comprises continuously supplying particles of the catalyst to a catalyst supply conduit intercommunicating with the conversion zone, admitting the hydrocarbon vapors to the conduit at a point down stream from said supply point to produce a gaseous dispersion of the particles, compacting the catalyst particles in the conduit between the point of their supply and the point of admission of the vapors thereby producing a seal, passing the dispersion thus produced upwardly through a reaction zone of relatively large cross sectional area wherein the vapor velocity is sufficiently low to cause a cloud-like formation of the catalyst particles in said zone, withdrawing vaporous conversion products and catalysts particles dispersed therein from the upper portion of said zone and passing it at a relatively high velocity to a separating zone wherein the used catalyst is separated from the vapors, dispersing the used catalyst in a stream of oxygen-containing gas, passing the dispersion thus produced through a regeneration zone at a suitable temperature to remove by combustion carbonaceous deposit therefrom, utilizing said regenerated catalyst to form said first named dispersion while the catalyst still retains sufficient heat developed during said regeneration treatment to maintain its temperature at a value approximating the required conversion temperature.

4. A process for catalytically converting hydrocarons involving contacting vapors of the hydrocarbons at an elevated temperature with a suitable catalyst which comprises continuously supplying a mass of particles of the catalyst to a catalyst supply conduit intercommunicating with the conversion zone, moving said mass of particles through said conduit toward said conversion zone, admitting a gaseous suspending medium into the conduit at a point downstream from said supply point to produce a gaseous dispersion of the particles, subjecting said mass of particles to increasing pressure as it moves between said supply point and the point of admission of the gaseous suspending medium to a maximum pressure effective to form a seal in the conduit between said gaseous dispersion and the catalyst supply point whereby flow of the gaseous component of said dispersion in said conduit between said gaseous dispersion and the point of catalyst supply is substantially prevented, conveying the gaseous dispersion in said conduit from the point of formation into the reaction zone, passing the dispersion of catalyst particles upwardly through a conversion zone of cross-sectional area substantially greater than that of the conduit whereby the gas velocity is lowered sufficiently to permit a portion of the catalyst particles to precipitate from the gaseous dispersion passing upwardly through the reaction zone maintaining hydrocarbon vapors in contact with the catalyst in said conversion zone under conditions effective to complete the desired reaction, withdrawing reaction products and catalyst from said conversion zone, and returning said withdrawn catalyst to said catalyst supply point.

5. A process for catalytically converting hydrocarbons involving contacting vapors of the hydrocarbons at an elevated temperature with a suitable catalyst which comprises supplying a loose mass of particles of the catalyst to a conduit communicating with the conversion zone, moving said mass of particles through said conduit toward said conversion zone, subjecting said mass of particles to increasing pressure as it moves through said conduit to a point of maximum pressure, suspending said mass in hydrocarbon vapors at a point beyond said point of maximum pressure on the catalyst mass to produce a gaseous dispersion of the catalyst particles and conveying said gaseous dispersion from that point through the conduit into the reaction zone, said pressure applied to the mass of catalyst particles being effective to form a seal in said conduit between said gaseous dispersion and the point of catalyst supply whereby flow of said hydrocarbon vapors in the conduit toward the point of catalyst supply is substantially prevented, passing the dispersion of catalyst particles and hydrocarbon vapors upwardly through a conversion zone of cross-sectional area substantially greater than that of the conduit whereby the gas velocity is lowered sufficiently to permit a portion of the catalyst particles carried by said vapors to precipitate from the vapors passing upwardly through the reaction zone, withdrawing reaction products and spent catalyst from said conversion zone, contacting spent catalyst with an oxygen-containing gas in a regeneration zone at a suitable temperature to remove by combustion carbonaceous deposits therefrom, and utilizing said regenerated catalyst to supply a loose mass of particles of catalyst to said conduit as described.

6. A process for catalytically converting hydrocarbons involving contacting vapors of the hydrocarbons at an elevated temperature with a suitable catalyst which comprises supplying a loose mass of particles of the catalyst to a conduit communicating with the conversion zone, moving said mass of particles through said conduit toward said conversion zone, subjecting said mass of particles to increasing pressure as it moves through said conduit to a point of maximum pressure, suspending said mass in hydrocarbon vapors at a point beyond said point of maximum pressure on the catalyst mass to produce a gaseous dispersion of the catalyst particles and conveying said gaseous dispersion from that point through the conduit into the reaction zone, said pressure applied to the mass of catalyst particles being effected to form a seal in said conduit between said gaseous dispersion and the point of catalyst supply whereby flow of said hydrocarbon vapors in the conduit toward the point of catalyst supply is substantially prevented, passing said hydrocarbon vapors upwardly through the conversion zone as a stream in contact with said catalyst under conditions effective to produce the desired cracking, withdrawing reaction products and spent catalyst from said conversion zone, supplying a loose mass of particles of said spent catalyst to a second conduit communicating with a regeneration zone, moving said mass of spent catalyst through said second conduit toward said regeneration zone, subjecting said mass of spent catalyst to increasing pressure as it moves through said second conduit to a point of maximum pressure, suspending said mass of spent catalyst in said second conduit in an oxygen-containing gas at a point beyond said point of maximum pressure to produce a gaseous dispersion of the spent catalyst particles in said oxygen-containing gas and conveying said gaseous dispersion from that point through said second conduit into the regeneration zone, the pressure applied to the mass of spent catalyst in said second conduit being effective to form a seal in said second conduit between the gaseous dispersion therein and the point of catalyst supply whereby flow of said oxygen-containing gas in said second conduit toward the point of catalyst supply is substantially prevented, passing said oxygen-containing gas as a stream in through said regeneration zone in contact with said catalyst under conditions effective to remove by combustion carbonaceous deposits from said catalyst and convert said oxygen-containing gas to flue gas, withdrawing flue gas and regenerated catalyst from said regeneration zone, and supplying said regenerated catalyst as a loose mass of particles to said first-mentioned conduit as described.

7. A process for catalytically converting hydrocarbons involving contacting vapors of the hydrocarbons at elevated temperature with a suitable catalyst to effect substantial conversion of the hydrocarbons with accompanying deposition of carbonaceous material on the surfaces of the catalyst particles to deactivate the catalyst, which comprises supplying a loose mass of particles of spent catalyst containing said carbonaceous deposits to a conduit communicating with a regeneration zone, moving said mass of spent catalyst through said conduit toward said regeneration zone, subjecting said mass of particles of spent catalyst to increasing pressure as it moves through said conduit to a point of maximum pressure, suspending said mass of spent catalyst in oxygen-containing gas at a point beyond said point of maximum pressure to produce a gaseous dispersion of the spent catalyst particles and conveying said gaseous dispersion from that point into the regeneration zone, the pressure applied to the mass of catalyst particles being effective to form a seal in said conduit between said gaseous dispersion and the point of catalyst supply whereby flow of said oxygen-containing gas in said conduit toward the point of catalyst supply is substantially prevented, passing said oxygen-containing gas as a stream through said regeneration zone in contact with said catalyst particles under conditions effective to regenerate said catalyst by combustion of carbonaceous deposits and convert said oxygen-containing gas to flue gas, withdrawing flue gas and regenerated catalyst from said regeneration zone, and supplying said regenerated catalyst to said hydrocarbon conversion step.

8. A process for catalytically converting hydrocarbons involving contacting vapors of the hydrocarbons at an elevated temperature with a suitable catalyst which comprises continuously supplying a mass of particles of the catalyst to a catalyst supply conduit intercommunicating with the conversion zone, moving said mass of particles through said conduit toward said conversion zone, admitting a gaseous suspending medium into the conduit at a point downstream from said supply point to produce a gaseous dispersion of the particles, subjecting said mass of particles to increasing pressure as it moves between said supply point and the point of admission of the gaseous suspending medium to a maximum pressure effective to form a seal in the conduit between said gaseous dispersion and the catalyst supply point whereby flow of the gaseous component of said dispersion in said conduit between said gaseous dispersion and the point of catalyst supply is substantially prevented, conveying the gaseous dispersion in said conduit from the point of formation into the reaction zone, passing the hydrocarbon vapors through the reaction zone in contact with said catalyst particles under conditions effective to complete the desired reaction, withdrawing reaction products and catalyst from said conversion zone, and returning said withdrawn catalyst to said catalyst supply point.

9. A process for catalytically converting hydrocarbons involving contacting vapors of the hydrocarbons at elevated temperature with a suitable catalyst to effect substantial conversion of the hydrocarbons with accompanying deposition of carbonaceous material on the surfaces of the catalyst particles to deactivate the catalyst, which comprises supplying a loose mass of particles of spent catalyst containing said carbonaceous deposits to a conduit communicating with a regeneration zone, moving said mass of spent catalyst through said conduit toward said regeneration zone, subjecting said mass of particles of spent catalyst to increasing pressure as it moves through said conduit to a point of maximum pressure, suspending said mass of spent catalyst in a gaseous suspending medium at a point beyond said point of maximum pressure to produce a gaseous dispersion of the spent catalyst particles and conveying said gaseous dispersion from that point into the regeneration zone, the pressure applied to the mass of catalyst particles being effective to form a seal in said conduit between said gaseous dispersion and the point of catalyst supply whereby flow of the gaseous component of said dispersion in said conduit toward the point of catalyst supply is substantially prevented, passing oxygen-containing gas through said regeneration zone in contact with said catalyst particles under conditions effective to regenerate said catalyst by combustion of carbonaceous deposits and convert said oxygen-containing gas to flue gas, withdrawing flue gas and regenerated catalyst from said regeneration zone, and supplying said regenerated catalyst to said hydrocarbon conversion step.

10. A process for catalytically converting hydrocarbons involving contacting vapors of the hydrocarbons at an elevated temperature with a suitable catalyst which comprises continuously supplying a mass of particles of the catalyst to a catalyst supply conduit intercommunicating with the conversion zone, moving said mass of particles through said conduit toward said conversion zone, subjecting said mass of particles to increasing pressure as it moves between said supply point and the conversion zone to a maximum pressure, suspending said mass of catalyst particles in hydrocarbon vapors at a point beyond said point of maximum pressure on the catalyst mass and maintaining said catalyst in suspension in said vapors in the conversion zone under conditions effective to complete the desired reaction, said maximum pressure applied to the mass of catalyst particles in said conduit being effective to form a seal in said conduit whereby flow of said hydrocarbon vapors in said conduit toward said point of catalyst supply is substantially prevented, withdrawing reaction products and spent catalyst from said conversion zone, supplying a loose mass of particles of said spent catalyst to a second conduit communicating with a regeneration zone, moving said mass of spent catalyst through said second conduit toward said regeneration zone, subjecting said mass of spent catalyst to increasing pressure as it moves through said second conduit to a point of maximum pressure, suspending said mass of spent catalyst in an oxygen-containing gas at a point beyond said point of maximum pressure on the catalyst mass in said second conduit and maintaining said spent catalyst in suspension in said oxygen-containing gas in the regeneration zone under conditions effective to remove by combustion carbonaceous deposits from said catalyst, said maximum pressure applied to the mass of spent catalyst in said second conduit being effective to form a seal in said conduit whereby flow of oxygen-containing gas in said conduit toward the point of catalyst supply to said second conduit is substantially prevented, withdrawing regenerated catalyst and regeneration gases from said regeneration zone, and supplying said regenerated catalyst as a loose mass of particles to said first-mentioned conduit as described.

11. A process for catalytically converting hydrocarbons involving contacting vapors of the hydrocarbons at an elevated temperature with a suitable catalyst which comprises continuously supplying a mass of hot particles of the catalyst to a catalyst supply conduit intercommunicating with the conversion zone, moving said mass of particles through said conduit toward said conversion zone, subjecting said mass of particles to increasing pressure as it moves between said supply point and the conversion zone to a maximum pressure, transferring said catalyst from said point of maximum pressure directly into a zone under a pressure not lower than the conversion zone pressure and into the conversion zone, suspending said mass of catalyst in hydrocarbon vapors after passage thereof through said point of maximum pressure on the catalyst mass in said conduit and maintaining said catalyst in suspension in said vapors in the reaction zone under conditions effective to complete the desired reaction, said pressure applied to the mass of catalyst particles in said conduit being effective to form a seal whereby flow of hydrocarbon vapors in said conduit toward said point of catalyst supply is substantially prevented, withdrawing reaction products and spent catalyst from said conversion zone, separating spent catalyst from gaseous and vaporous reaction products, transferring spent catalyst substantially free from said gaseous and vaporous reaction products to a regeneration zone, contacting spent catalyst with an oxygen-containing gas in said regeneration zone at a temperature effective to remove by combustion carbonaceous deposits therefrom, withdrawing flue gas and hot regenerated catalyst from said regeneration zone, and supplying hot regenerated catalyst to said conduit intercommunicating with the conversion zone, as described.

12. A process for catalytically converting hydrocarbons involving contacting vapors of the hydrocarbons at elevated temperature with a suitable catalyst to effect substantial conversion of the hydrocarbons with accompanying deposition of carbonaceous material on the surfaces of the catalyst particles, which comprises separating spent catalyst from gaseous and vaporous reaction products, supplying a loose mass of particles of said separated spent catalyst to a conduit intercommunicating with a regeneration zone, moving said mass of spent catalyst through said conduit toward said regeneration zone, subjecting said mass of particles of spent catalyst to increasing pressure as it moves through said conduit to a point of maximum pressure, transferring said spent catalyst from said point of maximum pressure directly into a zone under a pressure not lower than the regeneration zone pressure and into the regeneration zone, suspending said mass of spent catalyst in an oxygen-containing gas after passage thereof through said point of maximum pressure on the catalyst mass in said conduit and maintaining said catalyst in suspension in said gas in the regeneration zone under conditions effective to regenerate said catalyst by combustion of carbonaceous deposits, said pressure applied to the mass of spent catalyst particles in said conduit being effective to form a seal whereby flow of said oxygen-containing gas in said conduit toward said point of catalyst supply is substantially prevented, withdrawing regenerated catalyst and combustion gas from said regeneration zone, and supplying said regenerated catalyst to said hydrocarbon conversion step.

WILLIAM J. DEGNEN.

REFERENCES CITED

The following references are of record in the file of this patent:

UNITED STATES PATENTS

| Number | Name | Date |
|---|---|---|
| 1,769,789 | Leamon | July 1, 1930 |
| 1,497,751 | Hopkinson | June 17, 1924 |
| 1,799,858 | Miller | Apr. 7, 1931 |
| 1,860,199 | Osterstrom | May 24, 1932 |
| 1,873,783 | Osterstrom et al. | Aug. 23, 1932 |
| 1,949,673 | Baylis | Mar. 6, 1934 |
| 2,231,231 | Subkow | Feb. 11, 1941 |
| 2,231,424 | Huppke | Feb. 11, 1941 |
| 1,845,058 | Pier | Feb. 16, 1932 |
| 2,239,801 | Voorhees | Apr. 29, 1941 |
| 2,253,486 | Belchetz | Aug. 19, 1941 |
| 2,065,643 | Brandt | Dec. 29, 1936 |
| 2,289,329 | Prickett | July 7, 1942 |
| 2,325,516 | Holt et al. | July 27, 1943 |
| 2,349,478 | Tyson et al. | May 23, 1944 |